(12) United States Patent
Sheard et al.

(10) Patent No.: US 8,235,590 B2
(45) Date of Patent: Aug. 7, 2012

(54) THERMAL INSTRUMENT ENGINE

(75) Inventors: Justin M. Sheard, Rogers, MN (US);
Kirk R. Johnson, Rogers, MN (US);
Michael E. Loukusa, Buffalo, MN
(US); Richard M. Jamieson, Everett,
WA (US)

(73) Assignee: Fluke Corporation, Everett, WA (US)

( * ) Notice: Subject to any disclaimer, the term of this patent is extended or adjusted under 35 U.S.C. 154(b) by 1009 days.

(21) Appl. No.: 12/196,136

(22) Filed: Aug. 21, 2008

(65) Prior Publication Data
US 2010/0046577 A1 Feb. 25, 2010

(51) Int. Cl.
*G01J 5/00* (2006.01)

(52) U.S. Cl. ........................ 374/130; 374/100; 250/338.1

(58) Field of Classification Search .................. 374/100, 374/120–121, 130; 250/338.1, 332
See application file for complete search history.

(56) References Cited

U.S. PATENT DOCUMENTS

| | | | |
|---|---|---|---|
| 5,420,419 A * | 5/1995 | Wood | 250/338.4 |
| 6,023,061 A * | 2/2000 | Bodkin | 250/332 |
| 6,444,983 B1 * | 9/2002 | McManus et al. | 250/332 |
| 6,465,785 B1 * | 10/2002 | McManus | 250/338.1 |
| 6,538,250 B2 * | 3/2003 | McManus et al. | 250/332 |
| 6,674,080 B2 * | 1/2004 | Trempala et al. | 250/338.1 |
| 6,690,013 B2 * | 2/2004 | McManus | 250/338.1 |
| 6,953,932 B2 * | 10/2005 | Anderson et al. | 250/338.1 |
| 7,093,974 B2 * | 8/2006 | Kienitz | 374/121 |
| 7,105,818 B2 * | 9/2006 | Anderson et al. | 250/338.1 |
| 7,417,230 B2 * | 8/2008 | Anderson et al. | 250/338.1 |
| D585,927 S * | 2/2009 | Sheard et al. | D16/206 |
| 7,538,326 B2 * | 5/2009 | Johnson et al. | 250/370.08 |
| 7,693,679 B1 * | 4/2010 | Warnke et al. | 702/132 |
| 7,867,019 B1 * | 1/2011 | Loukusa et al. | 439/500 |
| 7,880,777 B2 * | 2/2011 | Anderson | 348/241 |
| 8,004,272 B2 * | 8/2011 | Jamieson et al. | 324/115 |
| 8,010,311 B1 * | 8/2011 | Warnke et al. | 702/132 |
| 2006/0249679 A1 * | 11/2006 | Johnson et al. | 250/332 |

* cited by examiner

*Primary Examiner* — Lisa Caputo
*Assistant Examiner* — Tania Courson
(74) *Attorney, Agent, or Firm* — Fredrikson & Byron, P.A.

(57) ABSTRACT

An engine for use in a thermal instrument. The engine includes an infrared camera module and may also include a visible light camera module. The engine includes several temperature sensors mounted on a printed circuit board assembly that permit the engine to provide improved radiometry functionality and improved fine offset compensation capabilities.

26 Claims, 6 Drawing Sheets

THERMAL INSTRUMENT ENGINE

TECHNICAL FIELD

The present disclosure pertains to thermal instruments that sense thermal data of a target scene and more particularly to an engine of such a thermal instrument.

BACKGROUND

Handheld thermal imaging cameras, for example, including microbolometer detectors to generate infrared images, are used in a variety of applications, which include the inspection of buildings and industrial equipment. Many state-of-the-art thermal imaging cameras have a relatively large amount of built-in functionality allowing a user to select a display from among a host of display options, so that the user may maximize his 'real time', or on site, comprehension of the thermal information collected by the camera.

As is known, infrared cameras generally employ a lens working with a corresponding infrared focal plane array (FPA) to provide an image of a view in a particular axis. The operation of such cameras is generally as follows. Infrared energy is accepted via infrared optics, including the lens, and directed onto the FPA of microbolometer infrared detector elements or pixels. Each pixel responds to the heat energy received by changing its resistance value. An infrared (or thermal) image can be formed by measuring the pixels' resistances—via applying a voltage to the pixels and measuring the resulting currents or applying current to the pixels and measuring the resulting voltages. A frame of image data may, for example, be generated by scanning all the rows and columns of the FPA. A dynamic thermal image (i.e., a video representation) can be generated by repeatedly scanning the FPA to form successive frames of data. Successive frames of thermal image data are generated by repeatedly scanning the rows of the FPA; such frames are produced at a rate sufficient to generate a video representation of the thermal image data. Individual pixels have unique response characteristics. These non-uniformities often result in fixed pattern noise. Many infrared cameras have functionality to provide the ability to correct for this. For example, some infrared cameras can automatically or manually perform offset compensation, which corrects for variations in the individual pixel responses by observing a uniform thermal scene (e.g., by placing a shutter between the optics and the FPA) and measuring offset correction data for each pixel which provides the desired uniform output response. These measured offset corrections are stored, then later applied in subsequent infrared measurements (e.g., with the shutter open) to correct for fixed pattern noise. Other compensations can also be applied, such as 2-point correction.

Temperature changes within or surrounding infrared cameras are found to result in the individual pixels further exhibiting their unique response characteristics. In particular, the change in temperature of the camera's internal components, e.g., due to self-heating or as the result of changes to the surrounding ambient temperature, leads to the individual pixels exhibiting fixed pattern noise over extended lengths of time. For example, during initial powering of an infrared camera, the internal components can be found to continue to rise in temperature for a period of time before the camera becomes thermally stable.

As is known, offset compensation functionality is found in most conventional infrared cameras because it leads to improved imaging capabilities. During the period when the shutter is placed between the optics and the FPA, thermal scene energy is focused on the shutter by the optics. Such energy may heat the shutter. In addition, the solenoid that actuates the shutter between its open and closed positions may heat up the shutter if the solenoid is frequently used. A change in shutter temperature may negatively impact the offset compensation functionality, resulting in poor imaging capabilities. It is believed that past infrared cameras have not accurately tracked changes in the shutter temperature.

Infrared cameras have often been used as radiometers to measure the temperature of objects or targets. Among other uses, these instruments are frequently used in industrial applications as part of a predictive maintenance program. These types of programs typically rely on periodic inspections of the assets of a plant or facility to discover likely failures before they occur. Often plant personnel will develop a survey route in order to routinely gather temperature data on the identified equipment. After collecting a baseline for each piece of equipment, or noting the specified operating temperatures, a technician can then identify changes in the thermal characteristics of equipment over the course of several inspections.

The principle of operation of a radiometer is well known. All surfaces at a temperature above absolute zero emit heat in the form of radiated energy. This radiated energy is created by molecular motion which produces electromagnetic waves. Some of the energy in the material is radiated away from the surface of the material. The radiometer is aimed at the surface from which the measurement is to be taken, and the radiometer optical system receives the emitted radiation and focuses it upon an infrared-sensitive detector. The detector generates an electrical signal which is internally processed by the radiometer circuitry (e.g., microprocessor). One or more temperature sensors help establish the absolute temperature of the detected radiation. The detected radiation may then be converted into temperature data, which can then be displayed.

A number of factors can introduce inaccuracies into the temperature measurements. For example, temperature changes within or surrounding infrared cameras are found to affect radiometry operation. In particular, the change in temperature of the camera's internal components, e.g., due to self-heating or as the result of changes to the surrounding ambient temperature, must be accounted for in a radiometry algorithm. One or more temperature sensors may be employed in positions throughout the camera to track the heat flow in or out of the camera. Past infrared camera designs have not provided such sensors in a compact, cost-effective manner.

SUMMARY OF THE INVENTION

Embodiments of the present disclosure relate to thermal instruments that sense thermal data of a target scene and more particularly to an engine of such a thermal instrument. Certain embodiments of a thermal instrument engine include a housing, a focal plane array (FPA) package that contains an FPA, a lens assembly for receiving thermal scene data and directing it towards the FPA, and a temperature sensor board (TSB) that has an aperture positioned over and generally coextensive with a window to the FPA. The TSB includes a plurality of sensors on opposing faces of the TSB, including a housing temperature sensor and an FPA temperature sensor.

Embodiments of the thermal instrument engine of the present invention also include an FPA package, a shutter movable to open and closed positions, and a TSB having an aperture, a thermally conductive pad, and a shutter temperature sensor, where the aperture is positioned over a window to the FPA and the thermally conductive pad is located proximate to a shutter park position on the TSB. The shutter temperature sensor is placed in thermal communication with the shutter via the thermally conductive pad.

Certain embodiments of the thermal instrument engine include a housing, a lens assembly, a FPA package, a TSB, and a shutter. The TSB contains one or more temperature sensors and is disposed between the FPA package and the lens assembly and has an aperture leading to a window to the FPA. The shutter is disposed between the TSB and the lens assembly and has open and closed positions.

Some embodiments of the thermal instrument engine of the present invention include a housing, a lens assembly, a FPA package, a first printed circuit board assembly (PCA), a second PCA, and a shield positioned between the first and second PCAs. The first PCA may contain analog electronics and the second PCA may contain digital electronics. A shield is positioned between the PCAs to provide thermal and electromagnetic shielding between the PCAs.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the invention.

Embodiments of the present invention relate to an engine for a thermal instrument where the engine includes a thermal sensor that senses thermal or infrared radiation from a target scene. In some embodiments, the engine includes imaging capabilities, such as thermal imaging capabilities where the thermal sensor comprises an array of infrared detectors that sense a thermal image of the target scene. In some such engine embodiments, the thermal instrument includes a display for viewing the sensed thermal imagery. Moreover, in some such engine embodiments, the thermal instrument may include a storage mechanism such that the instrument functions as an infrared (IR) camera module that senses and stores the thermal imagery. The engine of the thermal instrument may also include a visible light (VL) sensor that senses VL electromagnetic radiation from a target scene. The sensor may comprise an array of VL detectors in order to sense a VL imagery of the target scene. The VL imagery may be displayed or stored as noted above for the IR imagery. Such display may be of the VL imagery, the IR imagery, or a blended version of both of such images.

Figure 1:
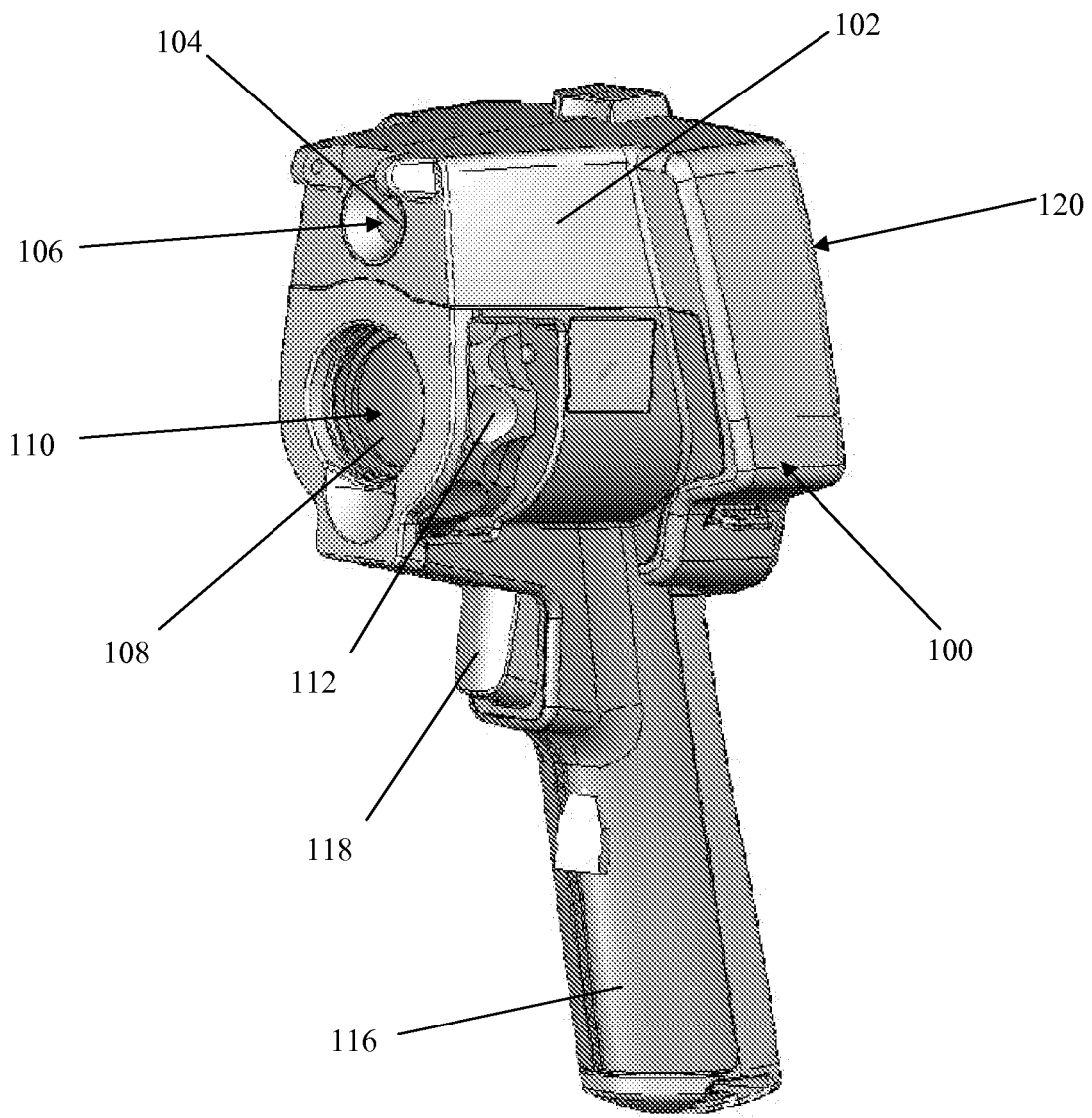
FIG. 1 is a front perspective view of a thermal instrument, according to some embodiments of the present invention.

FIG. 1 shows a front perspective view of a thermal instrument 100, according to some embodiments of the present invention. As described further below, thermal instrument 100 includes many of the different features of the thermal instrument described above. However, the inclusion of such features should not be interpreted as limiting on the claimed invention. Thermal instrument 100 includes camera housing 102, which supports the IR camera module and the VL camera module. The VL camera module includes a VL lens 104 for receiving a cone of VL energy from a target scene generally centered along input axis 106. The IR module includes an infrared (IR) lens 108, positioned below VL lens 104, for receiving a cone of IR energy from a target scene generally centered along input axis 110.

In certain embodiments, the visible light lens assembly is such that the visible light camera module remains in focus at all usable distances. Only the infrared lens needs focus adjustment for targets at different distances. The IR camera module includes a focusing assembly for focusing the IR lens 108. The focusing assembly includes a rotatable outer ring 112 having depressions to accommodate a tip of an index finger.

The placement of the VL camera module and IR camera module is such that the visible and infrared optical axes 106, 110 are as close as practical and roughly parallel to each other, for example, in the vertical plane of the infrared optical axis. Of course other spatial arrangements are possible. Because the optical paths for the sensors are different, each sensor will "see" the target scene from slightly different vantage points thereby resulting in parallax error. The parallax error may be corrected manually or electronically. For example, U.S. pat. app. Ser. No. 11/294,752, entitled "Visible Light and IR Combined Image Camera with a Laser Pointer," is incorporated herein in its entirety, discloses a parallax error correction architecture and methodology. This provides the capability to electronically correct the IR and VL images for parallax. In some embodiments, thermal instrument 100 includes the ability to determine the distance to target and contains electronics that correct the parallax error caused by the parallel optical paths using the distance to target information. In the embodiments further described below, the IR camera module includes an internal electronic sensor, such as a Hall effect sensor or other appropriate position sensor (e.g., linear position sensor such as a linear potentiometer, optical sensor, etc.), to determine the focus position of the IR lens assembly. An FPGA mounted to a digital electronics board within the engine for the thermal instrument 100 receives the sensor output, which approximates a distance to target input. The FPGA may then correct the parallax error between the infrared and visible light images and register them together before sending the combined imagery data to the camera display, as described in U.S. pat. app. Ser. No. 11/294,752.

Housing 102 also contains various electronics as will be described below. The housing 102 of instrument 100, may be formed from one or more injection molded, hard plastic parts, and provides an ergonomic user interface for various members of instrument 100. An upper portion of the housing 102 holds a thermal instrument engine 114 (FIG. 2) and the lower portion extends into a handle portion 116 for helping grasp the thermal instrument 100 during use. The handle portion 116 includes a trigger 118 mounted to the housing 102 below the outer ring 112 for image capture. The handle portion 116 may also include a power source, for example, a rechargeable battery. A display 120 is located on the back of the instrument so that infrared images, visible light images, and/or blended images of infrared and visible light may be displayed to the user. In addition, radiometric target site temperature (including temperature measurement spot size) and distance readings may be displayed.

Figure 2:
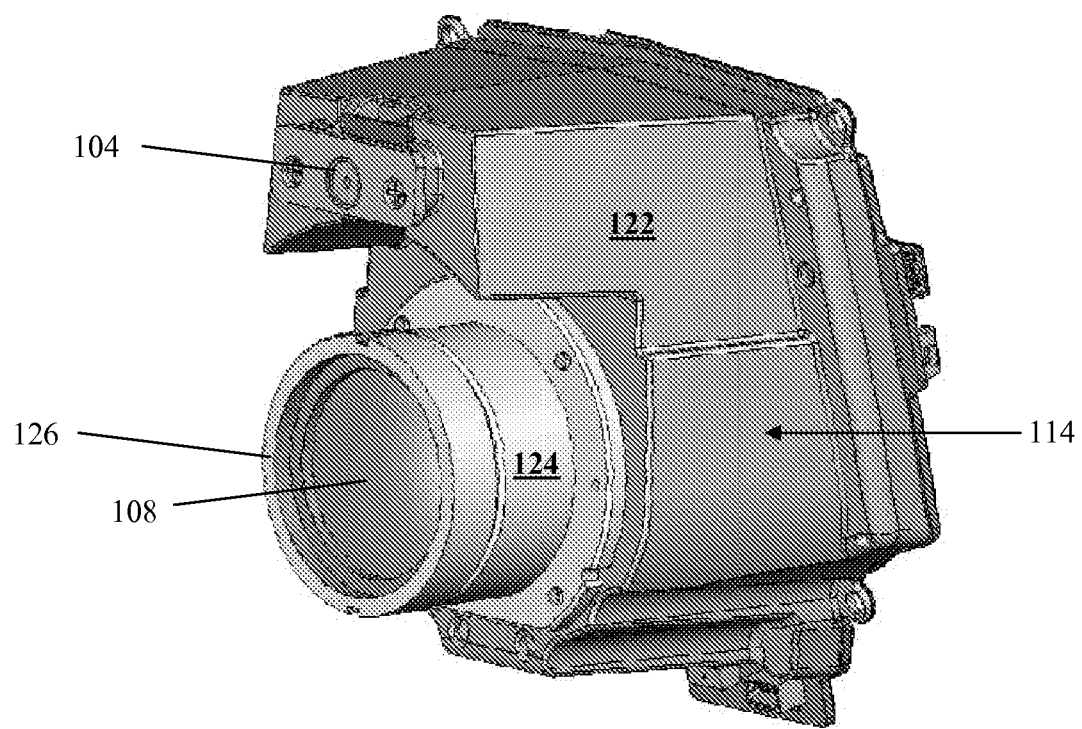
FIG. 2 is a front perspective view of an engine of a thermal instrument according to some embodiments.

FIG. 2 is a front perspective view of a thermal instrument engine 114 according to some embodiments. The engine 114 includes both an IR camera module and a VL camera module mounted above the IR camera module. In some embodiments, the VL module includes a visible light sensor formed of an array of detectors, such as CMOS, CCD or other types of visible-light detectors. In some embodiments, the array is 1280×1024 pixels (i.e., a 1.3 mega pixel camera). The VL module may also include an LED torch/flash and a laser pointer. The VL camera module streams RGB image display data (e.g. 30 Hz) to an FPGA for combination with infrared RGB image data from the IR camera module and then sends the combined image data to the display 120. In some embodiments, the VL camera module is not included.

Figure 3:
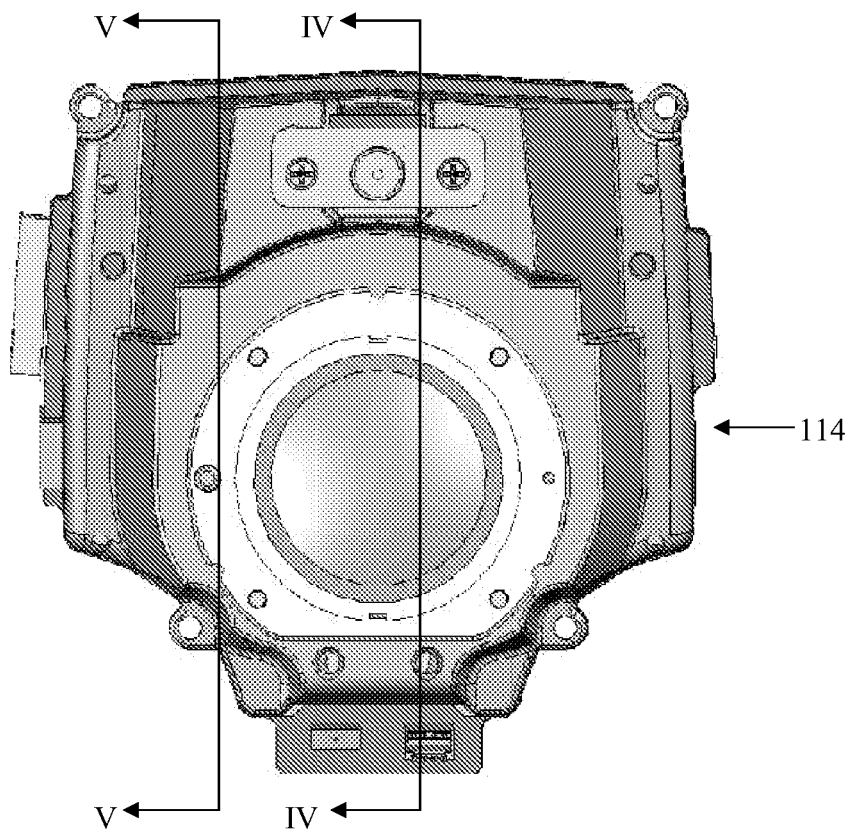
FIG. 3 is a front elevation view of the thermal instrument engine shown in FIG. 2, according to some embodiments.

As shown in FIG. 2, the engine 114 includes an engine housing 122 that supports the camera modules. The engine housing 122 may be formed of metal, such as aluminum, in order to provide adequate support and to provide a thermal capacitance to slow any changes in temperature of the engine 114, such as those due to environmental changes or self-heating from internal electronics. A metal engine housing also helps maintain an isothermal environment inside the engine. A lens body 124 is mounted to the engine housing 122 to support IR lens 108 and a rotatable inner focus ring 126, which is coupled to outer ring 112 (FIG. 1) for focusing the IR lens 108. FIG. 3 is a front elevation view of the thermal instrument engine 114 shown in FIG. 2, according to some embodiments.

Figure 4:
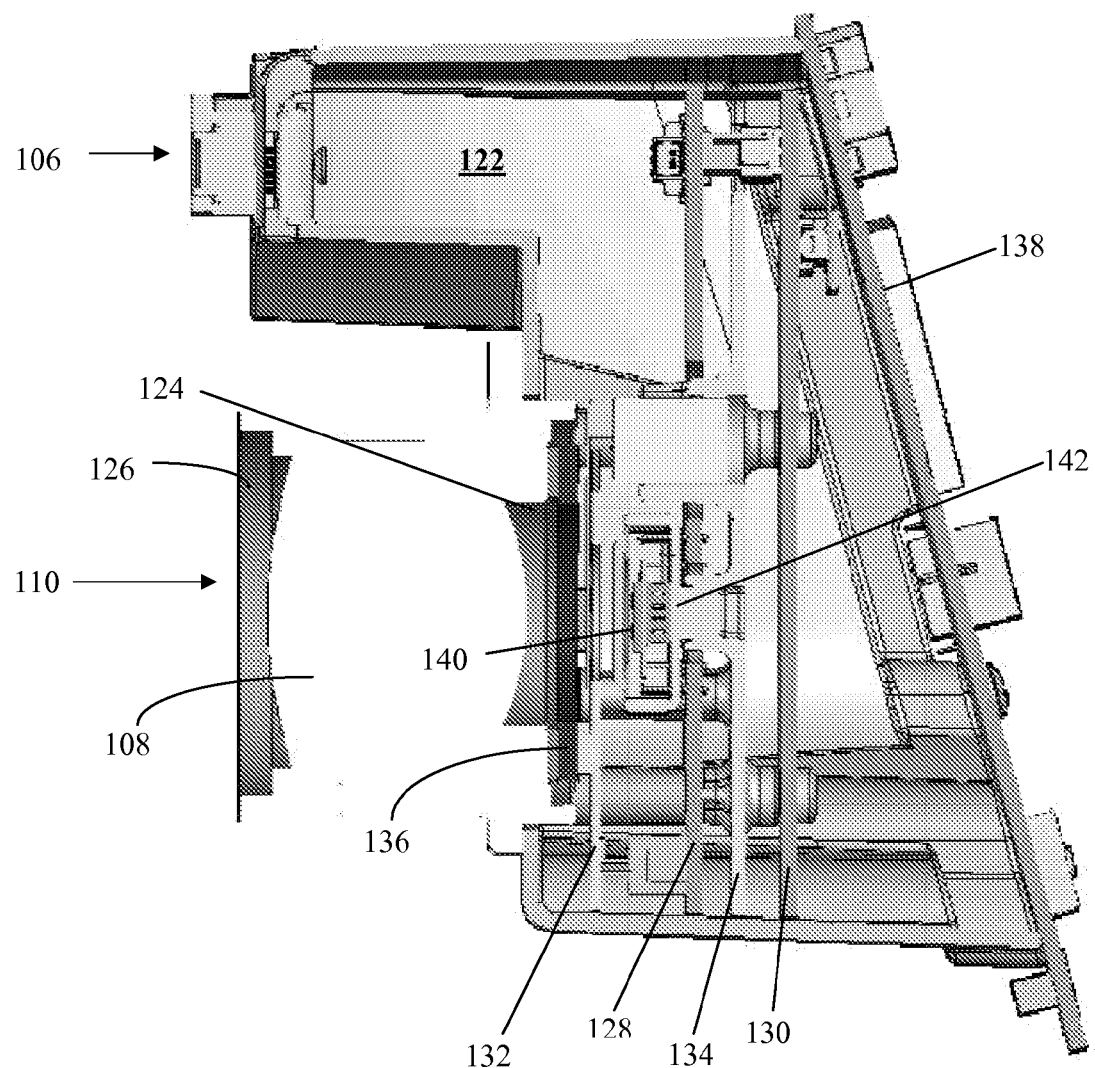
FIG. 4 is a cross-sectional view of the thermal instrument engine taken along line IV-IV of FIG. 3.

FIG. 4 is a cross-sectional view of the thermal instrument engine 114 taken along line IV-IV of FIG. 3 with the VL camera module removed and illustrates the IR lens assembly. FIG. 4 shows, in cross-section, the lens body 124 is mounted to the engine housing 122 to support the IR lens 108 and the rotatable inner focus ring 126, for focusing the IR lens 108. The rotatable inner focus ring 126 is coupled to the outer ring 112 (FIG. 1). FIG. 4 also shows a stack of printed circuit board assemblies (PCAs) that contain some of the electronics that support the engine operation. As will be described further below, the stack of PCAs includes a first PCA 128, a second PCA 130, a temperature sensor board (TSB) 132, and a shield 134. Also shown in FIG. 4 is a magnet 136 that is mounted to the IR lens. Accordingly, when the IR lens is focused, the magnet translates axially with the focusable lens in the lens assembly. Magnet 136 may be formed as a flat ring magnet with an aperture leading to the FPA that works in conjunction with a Hall-effect sensor mounted on the TSB 132 to provide the approximate distance to target information, which, as described above, may be used to correct the parallax error. A separate PCA 138 is provided on the back of the engine 114 to support the user interface and a display 120 (see FIG. 1).

Embodiments of the IR camera module of the present invention also include an IR sensor. In the embodiment shown in FIG. 4, the IR sensor is formed of a focal plane array (FPA) of uncooled microbolometers. In some embodiments, the FPA is an array of 160 by 120 microbolometer detector elements or pixels. In other models, the FPA size is 320 by 240 pixels. Other size arrays and other types of infrared detector elements besides microbolometers are within the scope of the present invention. In FIG. 4, the FPA 140 is housed and supported by an FPA package 142 that is mounted to the first PCA 128. The FPA package 142 may be made of metal to slow the temperature change of the FPA 140 and to help foster an isothermal environment for the FPA 140.

Figure 6:
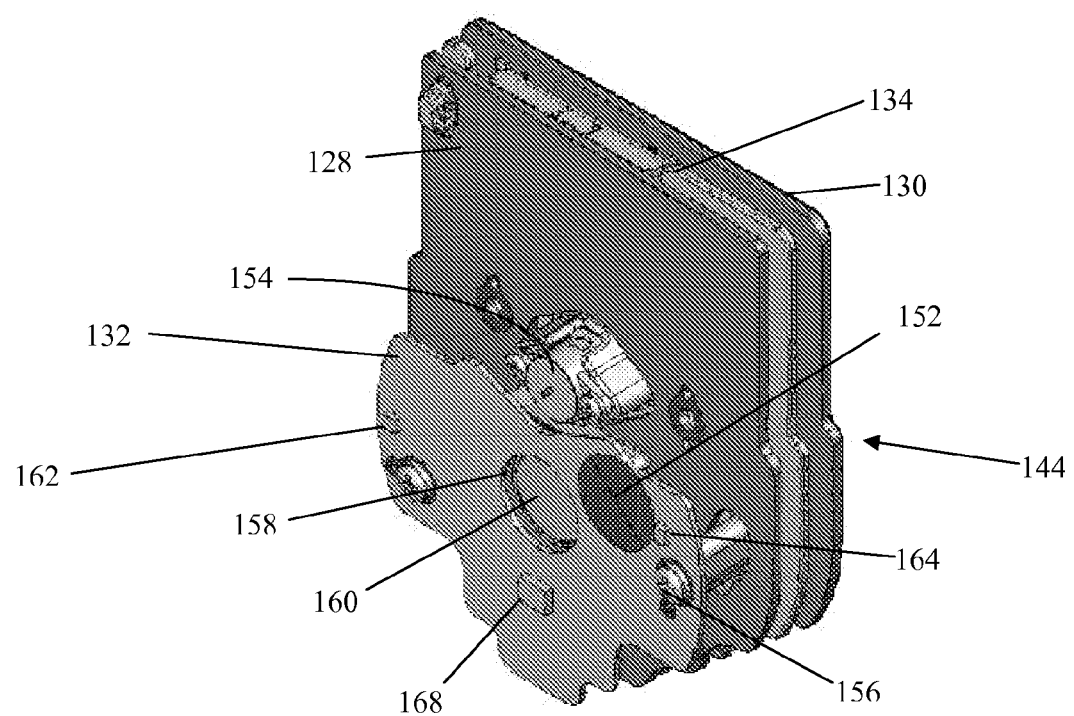
FIG. 6 is a front perspective view of a stack of printed circuit board assemblies from within the thermal instrument engine of FIG. 2, according to some embodiments and with the shutter removed.
Figure 8:
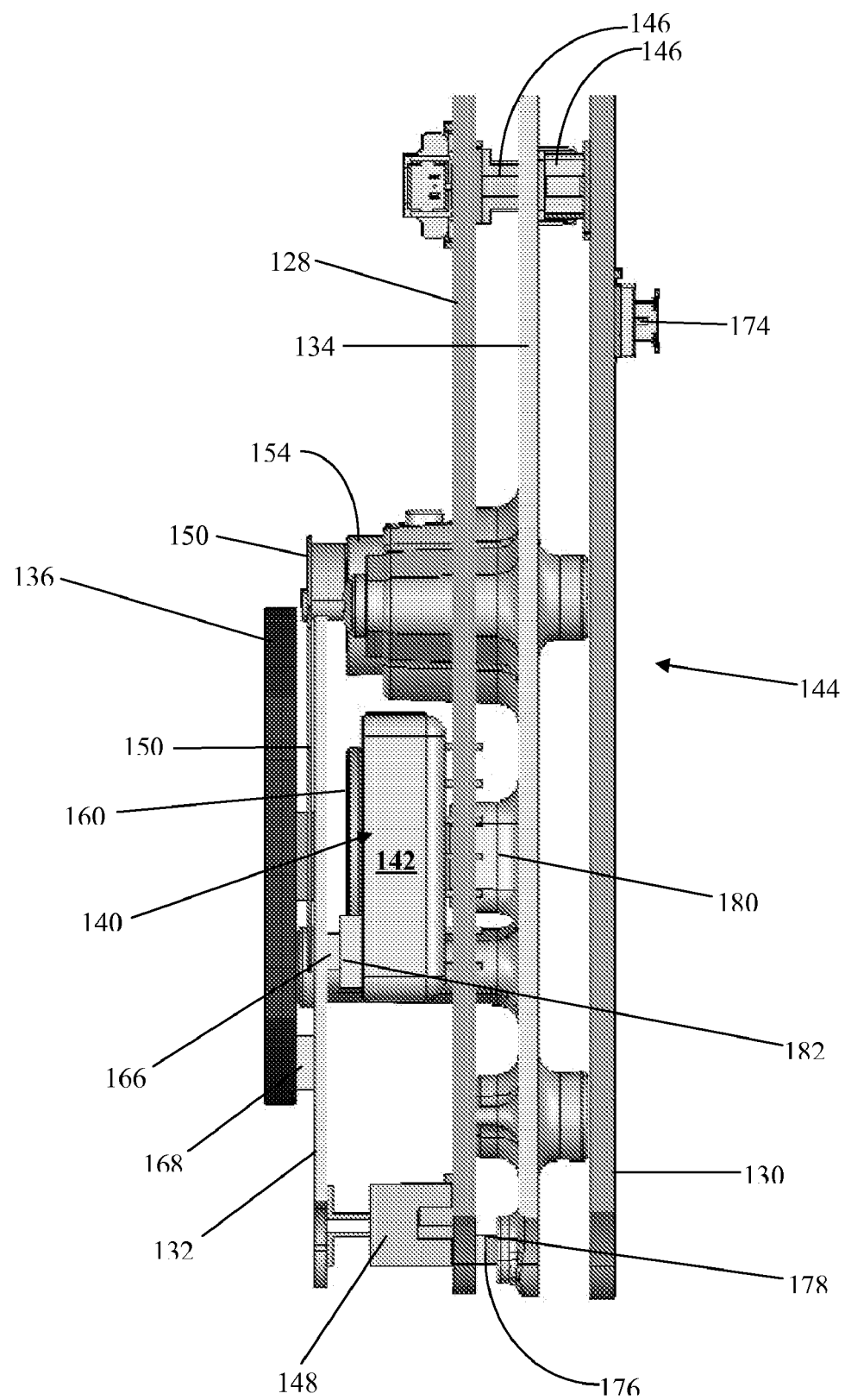
FIG. 8 is a cross-sectional view of the stack of printed circuit board assemblies taken along line VIII-VIII of FIG. 7, according to some embodiments, with a magnet from a lens assembly added to the drawing.

FIG. 6 is a front perspective view of the stack of PCAs 144 from within the thermal instrument engine 114 of FIG. 2, according to some embodiments. The shutter and many of the electronic components on the PCAs have been removed from view for clarity sake. The PCA stack 144 contains some of the electronics that support the engine operation and includes the first PCA 128, the second PCA 130, the temperature sensor board (TSB) 132, and the shield 134. The first PCA 128 and second PCA 130 are electrically connected via an electrical interconnect 146 (FIG. 8), and the TSB 132 and the first PCA 128 are electrically connected via a second electrical interconnect 148 (FIG. 8).

In some embodiments, the first PCA 128 generally contains the analog electronics of the IR camera module. The first PCA 128 also structurally supports the FPA package 142 (see FIGS. 4 and 8). The analog electronics on the first PCA 128 interface with and control the FPA 140, and stream raw infrared image data (e.g. 30 Hz) to a DSP mounted on the second PCA 130.

Figure 7:
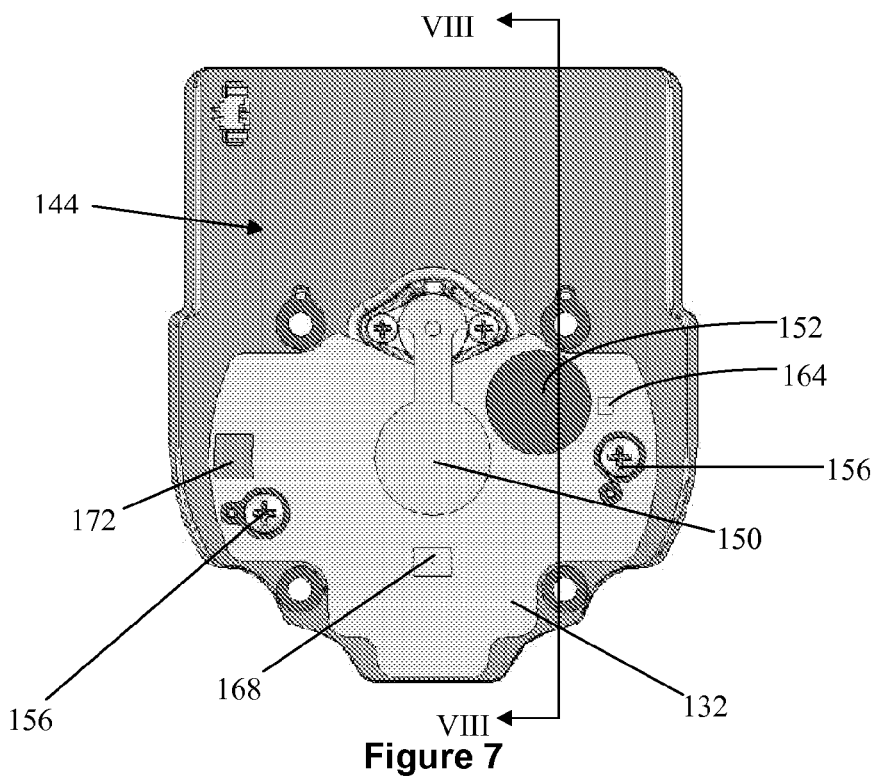
FIG. 7 is a front elevation view of the stack of printed circuit board assemblies shown in FIG. 6.

In some embodiments, the second PCA 130 generally contains digital electronic components, including the DSP and the FPGA. The DSP performs computations to convert the raw infrared image data to scene temperatures, and then to RGB colors corresponding to the scene temperatures and selected color palette. For example, U.S. Pat. No. 6,444,983 entitled "Microbolometer Focal Plane Array with Controlled Bias," is incorporated herein in its entirety, discloses such an infrared camera. The DSP then streams the resulting infrared RGB image display data to the FPGA where it is combined with the VL RGB image data and then sends the combined image data to the display 120. The FPGA operates under control of the DSP, which is further controlled by an embedded processor card engine. The FPGA controls the timing and actuation of the shutter 150 (see FIG. 7) between its closed position, as shown in FIG. 7, and its open position, where it is parked over thermally conductive pad 152 of the TSB 132.

The PCA stack 144 also includes a shield 134 between the first PCA 128 and the second PCA 130 that may provide several functions. In some embodiments, the shield is formed of metal, such as aluminum, steel, or a ferrous material. Accordingly, in some embodiments, the shield provides electromagnetic shielding between the electronics on the first PCA 128 and the second PCA 130. In some embodiments, the shield provides a relatively rigid structure for mounting and supporting other components, such as the PCAs and a support for the solenoid 154 that actuates the shutter. The shield may contain threaded bosses through which fasteners 156, such as screws, are inserted that hold the stack together. In some embodiments, the shield also provides significant thermal capacitance relative to other components internal to the engine. For instance, as discussed further below, the shield 134 is thermally coupled to the FPA package 142 to stabilize the FPA package temperature. Due to its proximity to the first PCA 128 and second PCA 130, the shield 134 in such embodiments will also help stabilize the temperature of the electronics on each PCA. The shield may also be thermally coupled to the engine housing in order to further facilitate an isothermal environment for the FPA.

The PCA stack 144 also includes a TSB (temperature sensor board) 132 mounted in front of the first PCA 128 and in front of the FPA 140 (see FIG. 4). TSB 132 includes an aperture 158 that is located in front of an FPA window 160 that leads to the FPA 140. In some embodiments, such as the one shown in FIG. 6, the aperture 158 is not an aperture stop that limits the amount of incoming IR radiation. Instead, the FPA 140 and the aperture 158 are sized and positioned to permit the entire cone of focused IR radiation coming from the IR lens 108 to pass through the FPA window 160 to the FPA 140. In certain embodiments, aperture 158 is generally coextensive with the FPA window 160. TSB 132 may include several different engine sensors mounted on either side of the printed circuit board forming the TSB 132. In certain embodiments, the TSB 132 includes one or more of the following sensors: housing temperature sensor 162, shutter temperature sensor 164, FPA temperature sensor 166, and Hall effect sensor 168. One or more of these temperature sensors may be employed to track the heat flow in or out of the instrument in order to provide improved radiometry functionality. In addition, one or more of such sensors may be used in offset compensation calculations. By placing one or more of such sensors on a single PCA, the engine may provide a compact and cost-effective, and improved design.

Figure 5:
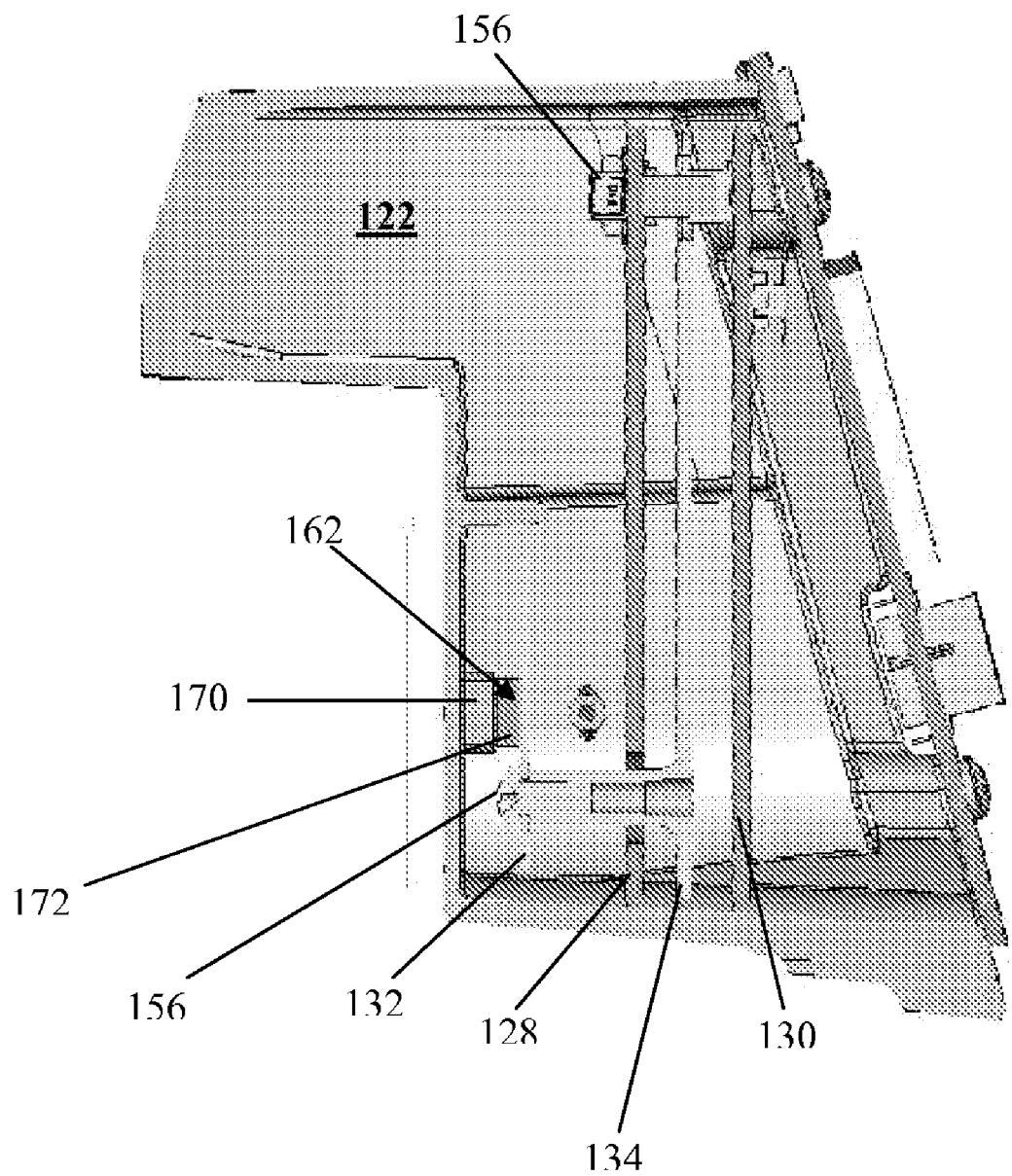
FIG. 5 is a cross-sectional view of the thermal instrument engine taken along line V-V of FIG. 3.

FIG. 5 is a cross-sectional view of the thermal instrument engine taken along line V-V of FIG. 3. FIG. 5 shows the PCA stack 144 including TSB 132, first PCA 128, second PCA 130, and shield 134 mounted within engine housing 122. FIG. 5 demonstrates how fastener 156 holds the stack together. FIG. 5 shows that housing temperature sensor 162 (see also FIG. 6), mounted on TSB 132, interfaces with housing 122. Housing 122 contains a thermal interconnect 170 formed as a protrusion from the interior surface of housing 122. A thermal contact pad 172 is interposed between housing temperature sensor 162 and thermal interconnect 170. The thermal coupling between the housing 122 and the housing temperature sensor 162 is facilitated by direct contact between the thermal interconnect 170 and the thermal contact pad 172. The thermal contact pad 172, in some embodiments, is an intermediate thermal layer, formed from a resilient material, the compression of which helps maintain the direct contact. The resilient material may be rubber or other elastomeric material. In some embodiments, metal powder or other metal particles are mixed into or infused into the elastomeric material. The metal increases the thermal conductivity of the pad to facilitate thermal communication. Accordingly, housing temperature sensor 162 is able to sense and track the temperature of housing 122.

FIG. 7 is a front elevation view of the PCA stack 144 shown in FIG. 6. Unlike FIG. 6, the shutter 150 is shown in FIG. 7. The shutter 150 is movable via the solenoid 154 (see FIG. 6) between open and closed positions. In the closed position, as shown in FIG. 7, the shutter 150 is moved in front of or aligned with the aperture 158, where it is positioned between the IR lens 108 and the FPA 140. In certain embodiments, the shutter is substantially coextensive with the aperture 158. In other embodiments, the shutter 150 is larger than the aperture 158. The closed position is appropriate for offset compensation of the engine 1 14. In the open position (not shown), the shutter is rotated generally out of alignment with the aperture 158, thereby permitting scene data collected by the IR lens to pass through the aperture 158 to the FPA. In certain embodiments, the shutter is parked over a thermally conductive pad 152 of the TSB 132 when in the shutter open position. The thermally conductive pad 152, in some embodiments, is generally planar and is formed of copper in the TSB circuit board. The pad 152 is thermally coupled to shutter temperature sensor 164, such as via a direct connection therebetween. Accordingly, the shutter temperature sensor 164 directly senses the temperature of pad 152. In some embodiments, such as the one shown in FIG. 7, the shutter 150 and the pad 152 are separated by a thin cushion of air when the shutter is in the open position. The shutter and the pad 152 may not contact each other. The cushion of air is thin enough (e.g., 0.5 to 50 mm) to effect indirect thermal coupling between the shutter 150 and the pad 152. Accordingly, the sensed temperature of the pad 152, via shutter temperature sensor 164, is indicative of the shutter temperature. Since accurate shutter temperature information is a useful input during offset compensation, the indirect measurement of the shutter temperature provides an improved method of offset compensation. Additionally, such shutter temperature information may also be used in heat flow determinations for radiometry calculations. Sensing the temperature of pad 152 provides a relatively accurate indication of the shutter temperature without having to contact the shutter directly. Since the shutter moves between open and closed positions, a system that contacted the shutter directly may eventually damage the shutter or its moving parts may eventually wear out.

In some embodiments, such as that shown in FIG. 7, the shutter is generally coextensive with the pad 152 when in the open position. In certain embodiments, the heat capacitance of the pad 152 is equal to or less than that of the shutter 150, such that, via indirect thermal coupling over the cushion of air, the pad temperature tends to assume the temperature of the shutter. In some embodiments, the pad 152 is designed with a heat capacitance relative to the shutter heat capacitance to generally equal the shutter temperature in less than one minute of being in the open position. During the period when the shutter is placed between the optics and the FPA, thermal scene energy is focused on the shutter by the IR lens 108. Such energy may heat the shutter. In addition, the solenoid that actuates the shutter between its open and closed positions may heat up the shutter if the solenoid is frequently used. If the shutter temperature is not accurately tracked, offset compensation calculations will be incorrect, resulting in poor imaging capabilities. That is, in past designs, relatively quick changes in shutter temperature may have resulted in poor imaging capabilities. It is believed that the indirect shutter temperature measurement described above will result in improved imaging capabilities. To the extent the shutter temperature changes relatively quickly, the indirect coupling between the shutter temperature sensor 164 and the shutter provides a shutter temperature measurement having improved accuracy. Moreover, if the heat capacitance of the pad 152 remains less than or equal to that of the shutter, the shutter temperature sensor can track the shutter temperature more quickly.

FIG. 8 is a cross-sectional view of the PCA stack taken along line VIII-VIII of FIG. 7, according to some embodiments, with a ring magnet from the IR lens assembly added to the drawing. The PCA stack includes the first PCA 128, the second PCA 130, the TSB 132, and the shield 134. FIG. 8 shows an electrical interconnect 148 between TSB 132 and first PCA that connects the electronics of the PCAs together. Electrical interconnect 146 is located between the first PCA 128 and the second PCA 130, and passes through the shield 134 to connect the electronics of the PCAs together. Another interconnect 174 is located on the back of the second PCA 130 for connection to other electrical components in the engine 114. The shield includes threaded bosses through which fasteners may be inserted to hold the stack together.

Also shown in FIG. 8 is a shield temperature sensor 176 mounted on the back of the first PCA 128 that is thermally coupled to the shield 134. The thermal communication between the shield temperature sensor 176 and the first PCA 128 is facilitated by a thermal contact pad 178, similar in design to the thermal contact pad 172 described above. The shield temperature sensor 176, mounted on a PCA, is a convenient means for sensing the temperature of the shield 134. Since the shield is thermally coupled to other engine components (e.g., FPA package 142, engine housing 122, PCAs, etc.), its temperature is a good indication of the temperature of many of the engine components and is therefore a useful parameter for radiometry calculations. At least one of such thermal connections to the shield is shown in FIG. 8. A thermal interconnect 180 is shown as a protrusion on the shield's surface, extending from the shield 134, through the first PCA, and into contact with the FPA package 142. A thermal contact pad may be inserted between this thermal interconnect 180 and the FPA package 142 to help ensure direct connect therebetween. A series of pins extending from the FPA package 142 into the first PCA may also structurally tie these components together and may help maintain physical contact between the FPA package 142 and the thermal interconnect 180. In other embodiments, the thermal interconnect 180 is fastened to or formed integrally with the FPA package to also provide structural support for the FPA package 142. In both of these embodiments, the shield 134, via this thermal interconnect 180, helps stabilize the temperature of the FPA package 142.

FIG. 8 also provides a cross-sectional view of the TSB 132. As shown by this view, the back side of TSB 132 includes an FPA temperature sensor 166 that is directly thermally coupled to the FPA package 142. The direct coupling may be via direct contact between the FPA temperature sensor 166 and the FPA package 142. In some embodiments, the direct coupling may also include a thermal contact pad 182 interposed between the FPA temperature sensor 166 and the FPA package 142. The thermal contact pad 182, similar to those described above, helps maintain direct contact and facilitates thermal communication. Accordingly, FPA temperature sensor 166, mounted on the backside of the TSB 132 is able to sense and track the FPA package 142 temperature. The FPA temperature sensor 166, along with the other temperature sensors disclosed above, track when the engine 114 is not an ideal isothermal environment for the FPA 140.

Hall effect sensor 168 is also shown in FIG. 8. It may be mounted to either the front or back side of TSB 132. As is demonstrated by the inclusion of magnet 136 in FIG. 8, by mounting Hall effect sensor 168 on the TSB 132, it may be situated very close to the magnet 136 in order to read the position of magnet 136 (e.g., the axial position of the IR lens 108). In addition, as is apparent from FIG. 8, shutter 150 is positioned on the front side of TSB 132 very close to the TSB 132 surface to facilitate indirect thermal communication with pad 152 and selectively over the front of aperture 158. By placing shutter 150 on the front side of TSB 132, the shutter, and any IR radiation emitted therefrom, is blocked from the FPA by TSB 132 when the shutter is in the open position. In some embodiments, the shutter is mounted for rotation between its open and closed positions at a position further away from TSB 132 and closer to magnet 136. One or more of the temperature sensors disclosed above may also be used to compensate for the effects of different temperatures on the operation of the Hall effect sensor 168. That is, the Hall effect sensor 168 may provide slightly different readings, under normal operating conditions, at different temperatures. By sensing the temperature surrounding the Hall effect sensor 168, the FPGA or other engine electronics may compensate or correct the Hall effect sensor reading. In the foregoing detailed description, the invention has been described with reference to specific embodiments. However, it may be appreciated that various modifications and changes can be made without departing from the scope of the invention as set forth in the appended claims.

We claim:

1. A thermal instrument engine, comprising:
   a housing;
   a focal plane array (FPA) package mounted within the housing, containing an FPA, and having a window opening to the FPA;
   a lens assembly coupled to the housing such that thermal scene data collected by a lens of the lens assembly is directed onto the FPA;
   a temperature sensor board (TSB) mounted within the housing adjacent to the FPA package, the TSB having an aperture positioned over and generally coextensive with the FPA window, the TSB including a plurality of sensors on opposing faces of the TSB including (i) a housing temperature sensor in thermal communication with an engine housing, and (ii) an FPA temperature sensor in thermal communication with the FPA package.

2. The thermal instrument engine of claim 1, further including a shutter mounted within the housing and being movable to open and closed positions, the closed position being such that the shutter is aligned with the aperture, the open position being such that the shutter is generally unaligned with the aperture, whereby the closed position may be used for offset compensation of the thermal instrument, and wherein the TSB includes a shutter temperature sensor in thermal communication with the shutter.

3. The thermal instrument engine of claim 2, wherein the shutter temperature sensor is in indirect thermal communication with the shutter.

4. The thermal instrument engine of claim 1, wherein the engine housing includes a thermal interconnect formed as a protrusion from the engine housing that extends toward the housing temperature sensor, the housing temperature sensor being in thermal communication with the engine housing via the thermal interconnect.

5. The thermal instrument engine of claim 4, further including a thermal contact pad interposed between the thermal interconnect and the housing temperature sensor to facilitate thermal communication therebetween.

6. The thermal instrument engine of claim 1, wherein the TSB further includes a lens position sensor on a face of the TSB, the lens position sensor sensing the axial position of the a magnet connected to the lens, the axial position of the lens changing with different focus positions of the lens.

7. The thermal instrument engine of claim 6, wherein the engine includes a visible light (VL) sensor having a separate lens assembly from the lens assembly of the FPA, creating a parallax error, the axial position of the lens as sensed through the lens position sensor being used to correct the parallax error.

8. The thermal instrument of claim 7, wherein the lens position sensor is a Hall effect sensor.

9. The thermal instrument of claim 7, wherein the one or more temperature sensors compensates for the effect of temperature on the lens position sensor.

10. The thermal instrument engine of claim 1, wherein one or more of the temperature sensors are used for offset compensation.

11. The thermal instrument engine of claim 1, wherein one or more of the temperature sensors are used for radiometry calculations.

12. A thermal instrument engine, comprising:
    a focal plane array (FPA) package containing an FPA and having a window opening to the FPA;

a shutter movable to open and closed positions; and
a temperature sensor board (TSB) having an aperture, a thermally conductive pad, and a shutter temperature sensor, the aperture positioned over the FPA window, the thermally conductive pad located proximate a shutter park position on the TSB, the shutter temperature sensor being in thermal communication with the shutter via the thermally conductive pad, and
wherein, in the closed position, the shutter is generally aligned with the aperture, and in the open position, the shutter is generally unaligned with the aperture and is positioned over the thermally conductive pad with a cushion of air therebetween to indirectly thermally couple the shutter to the thermally conductive pad, whereby the sensed temperature of the thermally conductive pad is indicative of the shutter temperature.

13. The thermal instrument engine of claim 12, wherein the thermally conductive pad is generally planar and is formed of copper in the TSB.

14. The thermal instrument engine of claim 12, wherein the shutter and the thermally conductive pad each have a thermal capacitance, the thermal capacitance of the thermally conductive pad being less than or equal to that of the shutter, whereby the temperature of the thermally conductive pad tends to follow the shutter temperature when the shutter is in the shutter park position on the TSB.

15. The thermal instrument engine of claim 12, wherein the thermally conductive pad generally equals the shutter temperature after the shutter is in the shutter park position for less than 1 minute.

16. The thermal instrument engine of claim 12, wherein the thermally conductive pad is generally coextensive with the shutter when the shutter is in the shutter park position on the TSB.

17. The thermal instrument engine of claim 12, wherein the shutter does not contact the thermally conductive pad when the shutter is in the shutter park position on the TSB.

18. The thermal instrument engine of claim 12, wherein the shutter temperature is used for offset compensation of the engine.

19. A thermal instrument engine, comprising:
a housing;
a lens assembly coupled to the housing and having a lens;
a focal plane array (FPA) package mounted within the housing, containing an FPA, and having a window opening to the FPA, the FPA aligned with the lens assembly such that thermal scene data collected by the lens is directed onto the FPA;
a temperature sensor board (TSB) disposed within the housing between FPA package and the lens assembly and containing one or more temperature sensors, the temperature sensed by the one or more temperature sensors being used for offset compensation or radiometry functionality for the thermal instrument engine, the TSB having an aperture leading to the FPA window; and
a shutter disposed between the TSB and the lens assembly, the shutter having an open and closed position controlled by a shutter actuator, the closed position being such that the shutter is aligned with the aperture thereby preventing scene data collected by the lens from reaching the FPA, the open position being such that shutter is generally unaligned with the aperture.

20. The thermal instrument engine of claim 19, wherein the one or more temperature sensors include one or more of (i) a housing temperature sensor in thermal communication with the housing, (ii) a shutter temperature sensor in thermal communication with the shutter, and (iii) an FPA temperature sensor in thermal communication with the FPA package.

21. The thermal instrument engine of claim 19, wherein the one or more temperature sensors are mounted on opposite sides of the TSB.

22. A thermal instrument engine, comprising:
a housing;
a lens assembly coupled to the housing;
a focal plane array (FPA) package mounted within the housing, containing an FPA, and having a window opening to the FPA, the FPA aligned with the lens assembly such that thermal scene data collected by the lens is directed onto the FPA;
a first printed circuit board assembly (PCA) disposed within the housing and including analog electronics;
a second PCA disposed within the housing, mounted below the first PCA, and connected to the first PCA at an interconnect, the second PCA including digital electronics;
a shield positioned between the first PCA and the second PCA providing thermal and electromagnetic shielding therebetween.

23. The thermal instrument engine of claim 22, wherein the FPA package is thermally connected to the shield, the shield having a substantially higher thermal capacitance than the FPA package, whereby the shield slows the temperature change of the FPA package.

24. The thermal instrument engine of claim 22, wherein one of the first PCA and the second PCA includes a temperature sensor coupled to the shield to sense the shield temperature.

25. The thermal instrument engine of claim 22, wherein the shield supports a solenoid that actuates the shutter between the open and closed positions.

26. The thermal instrument engine of claim 22, wherein the first PCA and second PCA are mounted to and supported by the shield.

* * * * *